United States Patent [19]

Hunt

[11] Patent Number: 5,103,858
[45] Date of Patent: Apr. 14, 1992

[54] VALVE AND AN ATOMISATION CHAMBER
[75] Inventor: Ian A. Hunt, Derby, England
[73] Assignee: Rolls-Royce pLc, London, England
[21] Appl. No.: 692,986
[22] Filed: Apr. 29, 1991
[30] Foreign Application Priority Data
  May 5, 1990 [GB] United Kingdom ............... 9010210
[51] Int. Cl.$^5$ ............................................. F16K 49/00
[52] U.S. Cl. .................................. 137/340; 251/305; 425/7
[58] Field of Search .................. 425/7; 137/340, 334; 251/305

[56] References Cited
U.S. PATENT DOCUMENTS

| | | | |
|---|---|---|---|
| 947,522 | 1/1910 | Allen, Jr. ............................ | 137/334 |
| 3,692,443 | 9/1972 | Lightner ............................ | 425/7 |
| 3,828,808 | 8/1974 | Ortelli .............................. | 137/340 |
| 3,971,414 | 7/1976 | Illing ............................... | 251/305 |
| 4,195,655 | 1/1980 | Augsburger et al. ............... | 137/334 |
| 4,233,007 | 11/1980 | Karlsson .......................... | 425/7 |
| 4,295,632 | 10/1981 | Engelke ........................... | 251/305 |
| 4,527,771 | 7/1985 | Yeary .............................. | 251/305 |
| 4,800,915 | 1/1989 | Hormel ............................ | 137/340 |

FOREIGN PATENT DOCUMENTS

| | | | |
|---|---|---|---|
| 0021275 | 1/1989 | Japan ............................... | 251/305 |
| 01-95080 | 8/1990 | Japan ............................... | 251/305 |

*Primary Examiner*—A. Michael Chambers
*Attorney, Agent, or Firm*—Cushman, Darby & Cushman

[57] ABSTRACT

A valve for an extraction device of a molten metal or molten alloy atomising chamber comprises a valve member which is rotatably mounted in a pipe. The peripheral edge of the valve member has a groove in which is located a rubber seal. A protecting member is located in the pipe upstream of the valve member with respect to the flow of an atomising gas and metal particles through the pipe. The protecting member is positioned such that when the valve member is in the open position the protecting member is immediately upstream of the peripheral edge of the valve member to prevent metal particles impinging upon and wearing the rubber seal. The protecting member is also supplied with cooling gas and is arranged to direct the cooling gas through passages over the surfaces of the valve member to prevent the seal overheating.

24 Claims, 3 Drawing Sheets

VALVE AND AN ATOMISATION CHAMBER

The present invention relates to valves, and in particular to butterfly valves for use in extraction systems for molten metal or alloy atomisation chambers.

A chamber for atomising molten metal or alloy comprises a device for atomising the molten metal or alloy and a collecting surface on which the molten metal or alloy is deposited. An extraction device is provided to remove gas, and metal or alloy not deposited on the collecting surface, from the chamber. A butterfly valve is used to control the flow of metal or alloy from the chamber. The peripheral edge of the butterfly valve is provided with a seal to maintain the chamber at a predetermined pressure or vacuum before the atomisation of the molten metal or alloy occurs.

A problem associated with the butterfly valve, is that when the valve is opened to allow the removal of metal or alloy not deposited on the collecting surface, the metal or alloy particles carried by the gas impinge on the peripheral edge of the valve. The metal or alloy particles, are abrasive and, wear away the seal at the peripheral edge of the valve. This may eventually result in the valve not sealing the chamber at the required predetermined pressure or vacuum, and necessitate the replacement of the seal, or replacement of the seal and valve member.

All the heat released during the solidification and cooling of the molten metal or alloy in the spray chamber is removed by the gas. This flows through the extraction device and through the butterfly valve. The temperature of the gas may be above the temperature range at which a rubber, or an elastomer, seal is designed to operate. These materials are a necessary part of a vacuum sealing valve. If the rubber or elastomer seal is subjected to gas which has a temperature above the operating temperature range of the seal, the seal may be damaged and lose its sealing properties, and this necessitates the replacement of the seal.

The present invention seeks to provide a valve in which both the above mentioned problems are overcome.

Accordingly the present invention provides a valve comprising a valve member having a sealing means arranged around its peripheral edge, the valve member being pivotably mounted in a conduit such that it is movable between a first position in which it prevents a flow of matter through the conduit and a second position in which it allows the flow of matter through the conduit, a protecting member is positioned in the conduit upstream of the valve member with respect to the flow of matter through the conduit, the protecting member is positioned in the conduit such that when the valve member is in its second position the protecting member is positioned immediately upstream of a portion of the peripheral edge of the valve member to prevent the flow of matter impinging upon the sealing means, a cooling fluid supply arranged to supply cooling fluid to the protecting member, the protecting member has at least one cooling fluid passage arranged to direct cooling fluid over at least one surface of the valve member when the valve member is in the second position.

Preferably the protecting member has a seating member which abuts the sealing means when the valve member is in the second position. The seating member may be arranged to be cooled by the cooling fluid.

The valve member may be arranged to be supplied with cooling fluid, the valve member has internal cooling fluid passages arranged to cool the valve member.

The conduit may have at least one cooling fluid passage arranged to direct cooling fluid over the seating surface of the conduit when the valve member is in the second position.

The conduit preferably has a circular cross-section, the valve member is disc shaped, the valve member is rotatably mounted on an axis arranged colinearly with a diameter of the disc. The protecting member may be at least part annular, the axis of the part annular protecting member is arranged perpendicularly to and intersects the axis of rotation of the valve member.

The axis of the part annular protecting member may be arranged colinearly with a diameter of the conduit.

A second part annular protecting member may be positioned in the conduit downstream of the valve member with respect to the flow of matter through the conduit, the axis of the second part annular protecting member is arranged perpendicularly to and intersects the axis of rotation of the valve member.

The axis of the second part annular protecting member may be arranged colinearly with a diameter of the conduit. The valve member may be offset from the axis of rotation of the valve member.

A second protecting member may be positioned in the conduit downstream of the valve member with respect to the flow of matter through the conduit.

Preferably the second protecting member has at least one cooling fluid passage arranged to direct cooling fluid over at least one surface of the valve member when the valve member is in the second position.

The sealing means may be a nitrile rubber seal or a fluoroelastomer seal.

The present invention also provides an atomising chamber having means for atomising a molten metal or molten alloy using an atomising gas, a collecting surface onto which the atomised metal or alloy is deposited, extraction means to remove the atomising gas and any metal or alloy not deposited on the collecting surface from the chamber, pipe means to interconnect the chamber and the extraction means, a valve member pivotably mounted in the pipe such that it is movable between a first position in which it substantially maintains the atomising chamber at a predetermined pressure or a vacuum and a second position in which it allows the flow of atomising gas and any metal or alloy through the pipe, the valve member has sealing means arranged around its peripheral edge, a protecting member positioned in the pipe upstream of the valve member with respect to the flow of the atomising gas and any metal or alloy through the pipe, the protecting member is arranged to be supplied with cooling fluid, the protecting member has at least one fluid passage arranged to direct the cooling fluid over at least one surface of the valve member when the valve member is in the second position, the protecting member is positioned in the pipe such that when the valve member is in the second position the protecting member is positioned immediately upstream of a portion of the peripheral edge of the valve member to prevent the flow of metal or alloy particles impinging upon the sealing means.

The present invention will be more fully described by way of example with reference to the accompanying drawings, in which.

Figure 1:
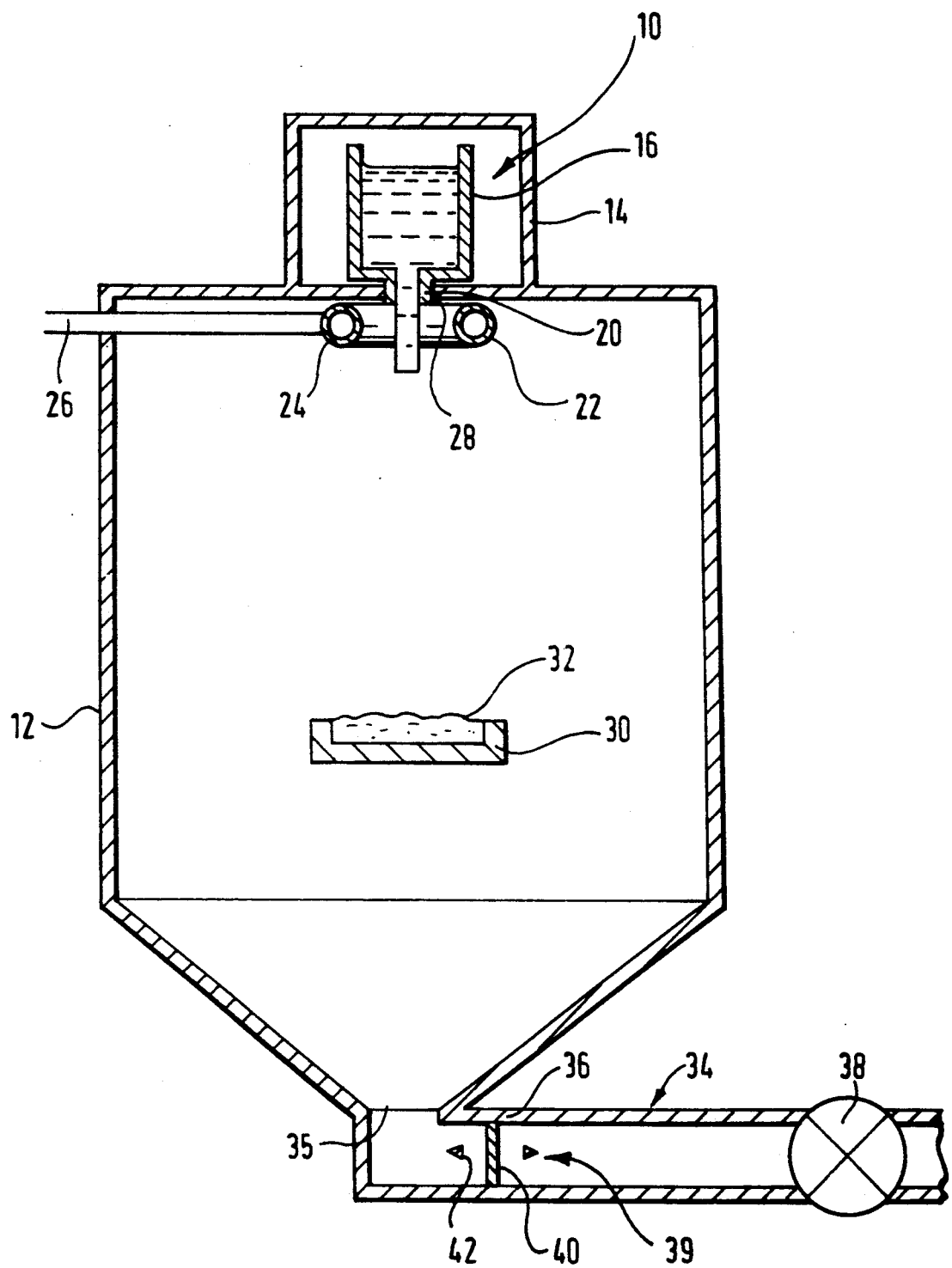
FIG. 1 is a cross-sectional view through a chamber having a valve according to the present invention.

A device 10 for atomising a molten metal, or molten alloy, is shown in FIG. 1 and comprises a crucible 16, which contains molten metal or alloy. The crucible 16 has a nozzle 20, at a vertically lower region, arranged to discharge the molten metal in a downwardly direction. An annular gas manifold 22 is positioned coaxially with the nozzle 20, and the gas manifold has a plurality of apertures 24 arranged to direct gas onto molten metal or molten alloy discharged from the nozzle 20, to atomise the molten metal or alloy. The gas manifold 22 is supplied with gas from a gas source via a pipe 26. The gas is normally chosen to be inert with respect to the metal or alloy being atomised, for example nitrogen or argon gas is used. However the gas may be chosen to be reactive with the molten metal or alloy to produce desired property changes to the metal or alloy.

The atomising device 10 is arranged to supply the molten metal, or molten alloy, into a first chamber 12. A collecting surface 30 is positioned within the first chamber 12, and molten metal or alloy 32 is deposited onto the collecting surface 30. The crucible 16 of the atomising device 10 is located in a second chamber 14 which is interconnected with the first chamber 12 by an aperture 28. The gas manifold 22 is located in the first chamber 12.

The metal or alloy deposited on the collecting surface 30 is subsequently processed to form a component, for example a turbine rotor disc. The processing may for example be hot isostatic pressing, forging or machining to a desired shape.

An extraction device 34 is provided to remove the atomising gas and any metal or alloy not deposited on the collecting surface from the first chamber 12. The first chamber 12 has an aperture 35 at a vertically lower region, and a pipe 36 interconnects the first chamber 12 with an extraction pump 38. However the aperture may be in the sides of the chamber 12. A valve 39 is provided which is closed to maintain the first chamber at a predetermined pressure or a vacuum and is opened to allow the removal of atomising gas and metal particles from the first chamber 12 by the extraction pump 38.

Figure 2:
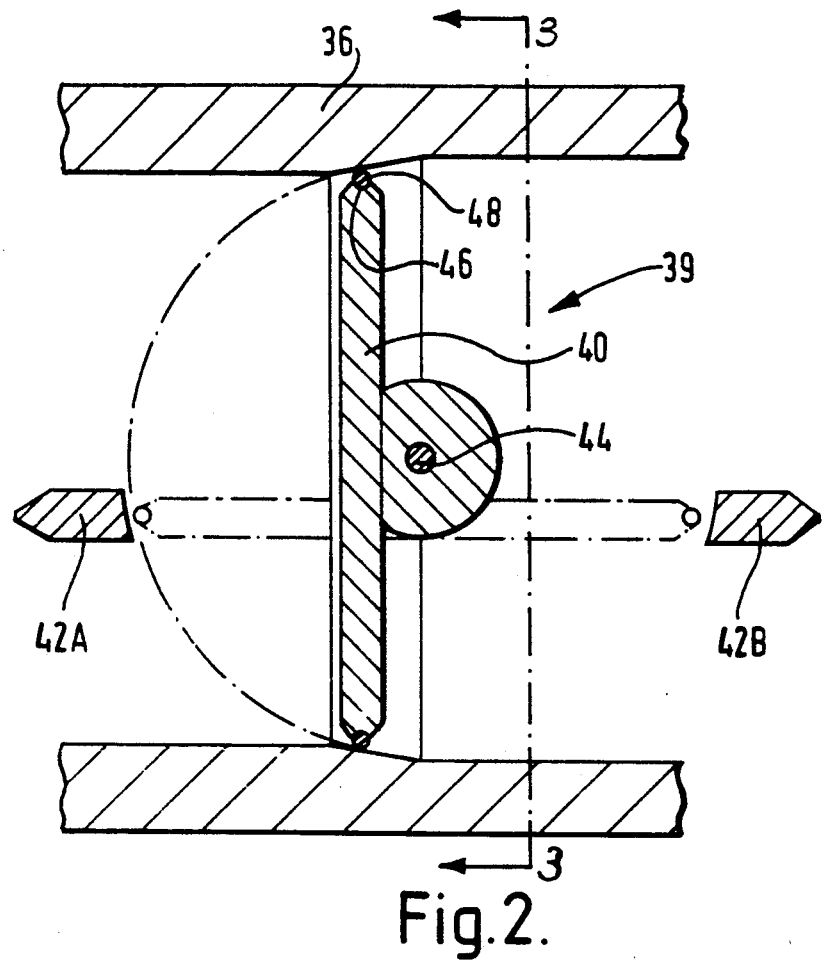
FIG. 2 is an enlarged cross-sectional view through the valve in FIG. 1.
Figure 3:
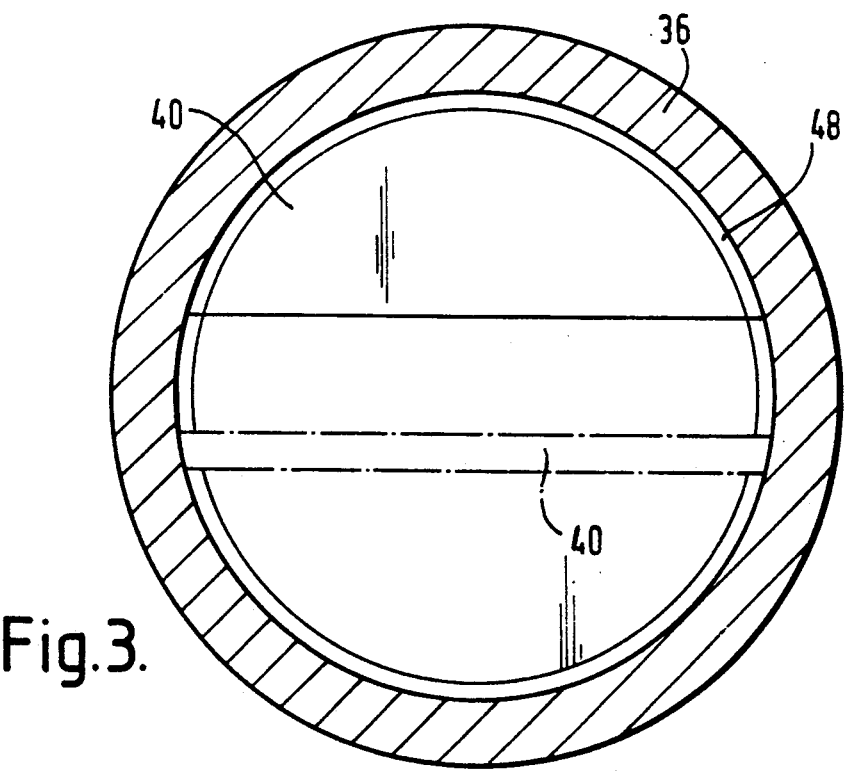
FIG. 3 is a cross-sectional view along lines A—A in FIG. 2.
Figure 4:
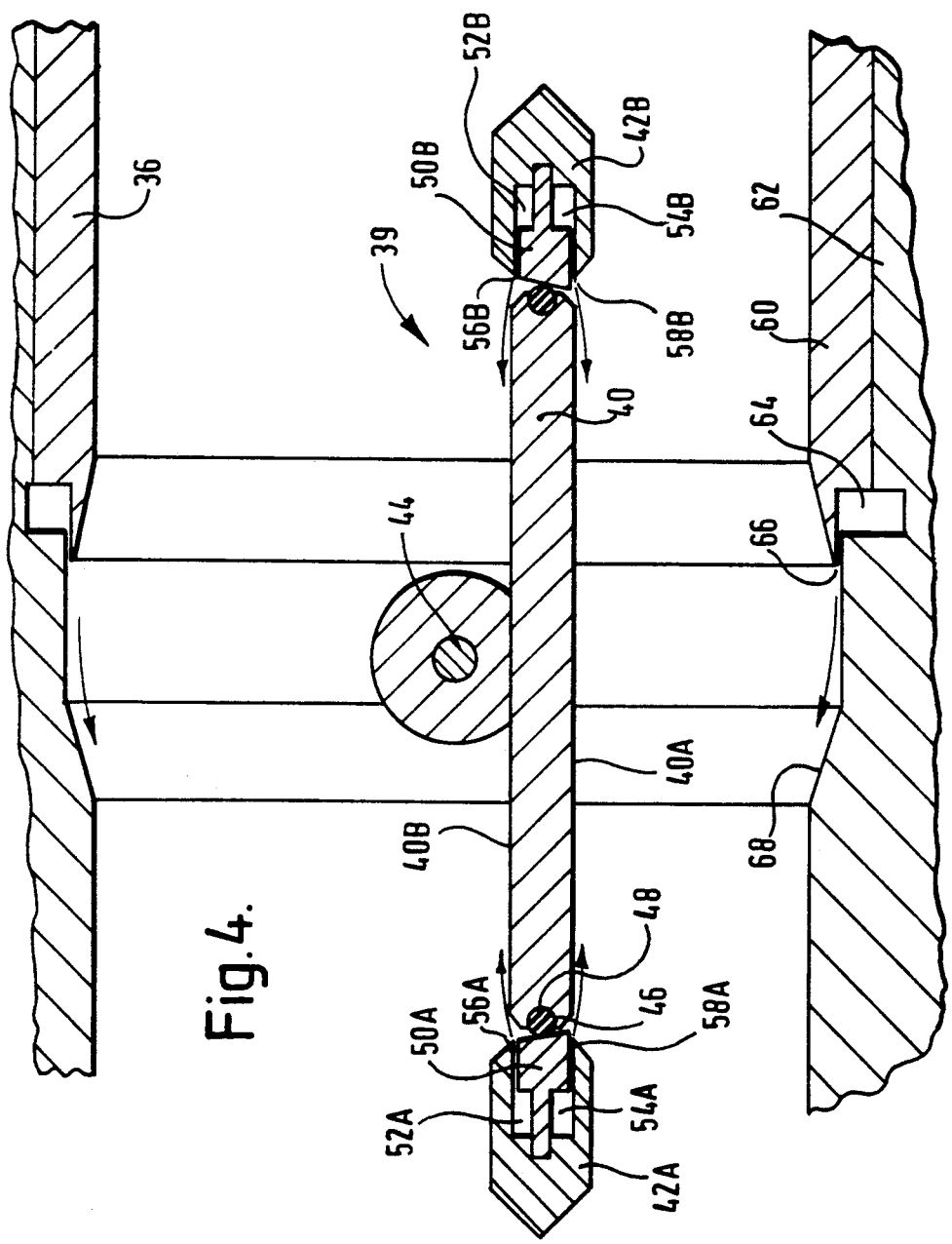
FIG. 4 is an enlargement of FIG. 2.

The valve 39 is shown more clearly in FIGS. 2, 3 and 4, and comprises a valve member 40 rotatably mounted in the pipe 36. The pipe 36 has a circular cross-section and the valve member 40 is disc shaped and is rotatably mounted on an axis arranged colinearly with a diameter of pipe 36 by a spindle 44. The valve member 40 is offset from the axis of rotation, and when the valve member 40 is in the open position the valve member 40 is displaced from the centre line of the pipe 36, in this example the pipe is horizontal and the valve member 40 is below the horizontal centre line of the pipe 36. The valve member 40 has a circumferentially extending groove 46 around its peripheral edge, and a sealing ring 48 is located within the groove 46. The sealing ring may be formed from nitrile rubber, fluoroelastomer or other suitable material.

The valve member 40 is rotated between a first position, shown in FIG. 2, in which the sealing ring seals with the pipe 36 to maintain the first chamber 12 at a predetermined pressure or a vacuum, and a second position, shown in FIG. 4, in which it allows the flow of atomising gas and any metal particles from the first chamber 12 to the pump 38.

A part annular protecting member 42A is positioned in the pipe 36, and the axis of the part annular protecting member 42A is arranged colinearly with a diameter of he pipe 36 and perpendicularly to and intersects the axis of rotation of the valve member 40. The part annular protecting member 42A is located in the pipe 36 such that when the valve member 40 is in its second position the protecting member 42A is immediately upstream of a portion of the peripheral edge of the valve member 40 to prevent metal particles impinging upon the sealing ring 48. The inner diameter of the part annular protecting member 42A is substantially the same as the outer diameter of the valve member 40.

Similarly a part annular protecting member 42B is positioned in the pipe 36, and the axis of the part annular protecting member 42B is arranged colinearly with a diameter of the pipe 36 and perpendicularly to and intersects the axis of rotation of the valve member 40. The part annular protecting member 42B is located in the pipe 36 such that when the valve member 40 is in its second position the protecting member 42B is immediately downstream of a portion of the peripheral edge of the valve member 40 to prevent metal particles impinging upon the sealing ring 48. The inner diameter of the part annular protecting member 42B is equal to that of member 42A. The part annular protecting members 42A and 42B are displaced from the centre line of the pipe 36 and in this example are below the horizontal centre line of the pipe 36.

The part annular protecting members 42A,42B together with the pipe 36 form a complete annular protecting assembly to protect the peripheral edge and sealing ring when the valve 39 is open.

The part annular protecting members 42A and 42B carry part annular seating members 50A and 50B respectively, on their radially inner ends, and the sealing ring 46 abuts the seating members 50A and 50B when the valve member 40 is in the second position i.e. the open position. The part annular protecting member 42A and the part annular seating member 50A define first and second part annular gas manifolds 52A and 54A, which are supplied with cooling gas through ports in the pipe 36. Part annular passages 56A and 58A extend radially inwardly from the first and second gas manifolds 52A and 54A between the protecting member 42A and the seating member 50A. Similarly the part annular protecting member 42B and the part annular seating member 50B define third and fourth part annular gas manifolds 52B and 54B, which are also supplied with cooling gas through ports in the pipe 36. Part annular passages 56B and 58B extend radially inwardly from the third and fourth gas manifolds 52B and 54B between the protecting member 42B and the seating member 50B.

In operation, when the valve member is in the second position, cooling gas is supplied through the ports in the pipe 36 to the first, second, third and fourth gas manifolds 52A,54A,52B and 54B. The cooling gas then flows out of the gas manifolds through the passages 56A,58A,56B and 58B. The cooling gas convectively cools the seating members 50A and 50B, which in turn cool the sealing ring 46 by conduction. The cooling gas discharged from the passages 56A,58A,56B and 58B flows over both surfaces 40A and 40B of the valve member 40 to convectively cool it, and to prevent hot atomising gas and any metal particles heating the valve member 40. This prevents any excessive rise in temperature of the sealing ring 46.

It is to be noted that the part annular protecting member 42A is wider than the valve member 40 so that the part annular protecting member 42A causes the hot atomising gas and any metal particles to flow away from the surfaces 40A and 40B of the valve member 40.

The cooling gas discharged from the passages 56A, 56B, 58A and 58B flows over the surfaces 40A and 40B of the valve member 40 between the surfaces of the valve member 40 and the hot atomising gas flow to provide film cooling of the valve member 40.

It may be possible to provide further cooling of the valve member by providing cooling gas passages in the valve member, and by supplying and removing cooling gas from the passages in the valve member through supply ducts in the spindle.

The pipe 36 has concentric ring portions 60 and 62 which define an annular gas manifold 64 and an annular discharge slot 66. The slot 66 is arranged to direct clean cooling gas towards the surface 68 of the pipe 36 where the sealing ring 46 seats when the valve member 40 is in the first position i.e. closed position. In operation, when the valve member 40 is in the second position, cooling gas is directed against the surface 68 to protect the surface 68 from the metal particles in the hot atomising gas. Alternatively clean gas may be directed against the surface 68 to blow debris, metal particles, from the surface 68 before the valve is closed.

It is preferred that the valve is mounted in a vertical conduit, which is arranged to have a downward flow of gas. This is so that gravity can assist the cooling gas directed from the annular discharge slot 66 to prevent metal particles or flakes collecting on the surface 68 of the pipe 36, when the valve member 40 is in the second position i.e. open position. The build up of metal particles or flakes on the surface 68 of the pipe 36 is undesirable as it may subsequently prevent the valve member 40 closing or the metal particles or metal flakes may be trapped between the valve member 40 and the surface 68 of the pipe 36.

The invention has been described with reference to a disc shaped valve member which is offset from its axis of rotation. However, the invention is applicable to a disc shaped valve member which is rotatably mounted about its diameter so that when the valve member is in the open position the valve is arranged transversely to the centre line of the pipe. The protecting members are also arranged transversely to the centre line of the pipe.

Although the invention has been described with reference to a disc shaped valve member for use in a circular cross-section pipe, the invention is equally applicable to other shapes of valve members and cross-sections of pipes. As an example a rectangular shaped valve member and a rectangular cross-section pipe may be used. In such an example the protecting member is linear. The valve member in this circumstance may be pivotably mounted about an axis arranged centrally of the valve member or about an axis on one edge of the valve member.

I claim:

1. A valve comprising a conduit, a valve member having surfaces and a sealing means arranged around its peripheral edge, the valve member being pivotably mounted in the conduit such that it is movable between a first position in which it prevents a flow of matter through the conduit and a second position in which it allows the flow of matter through the conduit, a protecting member which is positioned in the conduit upstream of the valve member with respect to the flow of matter through the conduit, the protecting member being positioned in the conduit such that when the valve member is in its second position the protecting member is positioned immediately upstream of a portion of the peripheral edge of the valve member to prevent the flow of matter impinging upon the sealing means, a cooling fluid supply arranged to supply cooling fluid to the protecting member, the protecting member having at least one cooling fluid passage arranged to direct cooling fluid over at least one surface of the valve member exposed to the flow of matter through the conduit when the valve member is in the second position.

2. A valve as claimed in claim 1 in which the protecting member has a seating member which abuts the sealing means when the valve member is in the second position.

3. A valve as claimed in claim 2 in which the seating member is arranged to be cooled by the cooling fluid.

4. A valve as claimed in claim 1 in which the valve member is arranged to be supplied with cooling fluid, the valve member has internal cooling fluid passages arranged to cool the valve member.

5. A valve as claimed in claim 1 in which the conduit has a seating surface against which the valve member seats when the valve member is in the first position, the conduit has at least one cooling fluid passage arranged to direct cooling fluid over the seating surface of the conduit when the valve member is in the second position.

6. A valve as claimed in claim 1 in which the conduit has a circular cross-section, the valve member is disc shaped, the valve member is rotatably mounted on an axis arranged colinearly with a diameter of the disc.

7. A valve as claimed in claim 6 in which the protecting member is at least part annular, the axis of the part annular protecting member is arranged perpendicularly to and intersects the axis of rotation of the valve member.

8. A valve as claimed in claim 7 in which the axis of the part annular protecting member is arranged colinearly with a diameter of the conduit.

9. A valve as claimed in claim 6 in which the valve member is offset from the axis of rotation of the valve member.

10. A valve as claimed in claim 1 in which a second protecting member is positioned in the conduit downstream of the valve member with respect to the flow of matter through the conduit.

11. A valve as claimed in claim 10 in which the second protecting member has at least one cooling fluid passage arranged to direct cooling fluid over at least one surface of the valve member when the valve member is in the second position.

12. A valve as claimed in claim 1 in which the protecting member has cooling fluid passages arranged to direct cooling fluid over the surfaces of the valve member exposed to the flow of matter through the conduit when the valve member is in the second position.

13. A valve as claimed in claim 1 in which the protecting member has a dimension transverse to the direction of flow of matter through the conduit greater than the valve member when the valve member is in the second position, to direct the matter away from at least one surface of the valve member.

14. An atomising chamber having means for atomising a molten metal or molten alloy using an atomising gas, a collecting surface onto which the atomised metal or alloy is deposited, extraction means to remove the atomising gas and any metal or alloy not deposited on the collecting surface from the chamber, pipe means to interconnect the chamber and the extraction means, a valve member pivotably mounted in the pipe such that it is movable between a first position in which it substantially maintains the atomising chamber at a predetermined pressure or a vacuum and a second position in which it allows the flow of atomising gas and any metal or alloy through the pipe, the valve member has surfaces and sealing means arranged around its peripheral edge, a protecting member positioned in the pipe upstream of the valve member with respect to the flow of the atomising gas and any metal or alloy through the pipe, the protecting member is arranged to be supplied with cooling fluid, the protecting member has at least one cooling fluid passage arranged to direct cooling fluid over at least one surface of the valve member when the valve member is in the second position, the protecting member is positioned in the pipe such that when the valve member is in the second position the protecting member is positioned immediately upstream of a portion of the peripheral edge of the valve member to prevent the flow of metal or alloy particles impinging upon the sealing means.

15. A chamber as claimed in claim 12 in which the valve member is arranged to be supplied with cooling fluid, the valve member has internal cooling fluid passages arranged to cool the valve member.

16. A chamber as claimed in claim 14 in which the protecting member has a seating member which abuts the sealing means when the valve member is in the second position, the seating member is arranged to be cooled by the cooling fluid.

17. A chamber as claimed in claim 14 in which the pipe has cooling fluid passages arranged to direct cooling fluid over the seating surface of the pipe when the valve member is in the second position.

18. A chamber as claimed in claim 14 in which the pipe has a circular cross-section, the valve member is disc shaped, the valve member is rotatably mounted on an axis arranged colinearly with a diameter of the disc.

19. A chamber as claimed in claim 16 in which the protecting member is at least part annular, the axis of the part annular protecting member is arranged perpendicularly to and intersects the axis of rotation of the valve member.

20. A chamber as claimed in claim 19 in which the axis of the part annular protecting member is arranged colinearly with a diameter of the pipe.

21. A chamber as claimed in claim 14 in which the valve member is offset from the axis of rotation of the valve member.

22. A chamber as claimed in claim 14 in which a second protecting member is positioned in the pipe downstream of the valve member with respect to the flow of atomising gas and any metal or alloy particles through the pipe.

23. A chamber as claimed in claim 22 in which the second protecting member has cooling fluid passages arranged to direct cooling fluid over at least one surface of the valve member when the valve member is in the second position.

24. A chamber as claimed in claim 14 in which the pipe means has at least one portion which extends in a vertical direction, the valve member is pivotally mounted in the portion which extends in a vertical direction.

* * * * *